(12) United States Patent
Li et al.

(10) Patent No.: US 12,394,821 B2
(45) Date of Patent: *Aug. 19, 2025

(54) ALL-SOLID-STATE BATTERY

(71) Applicant: TOYOTA JIDOSHA KABUSHIKI KAISHA, Toyota (JP)

(72) Inventors: Ximeng Li, Susono (JP); Masafumi Nose, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,939

(22) Filed: May 17, 2024

(65) Prior Publication Data

US 2024/0304858 A1 Sep. 12, 2024

Related U.S. Application Data

(63) Continuation of application No. 17/016,794, filed on Sep. 10, 2020, now Pat. No. 12,027,662.

(30) Foreign Application Priority Data

Sep. 24, 2019 (JP) .................. 2019-173061

(51) Int. Cl.
*H01M 10/0562* (2010.01)
*H01M 4/02* (2006.01)
(Continued)

(52) U.S. Cl.
CPC ....... *H01M 10/0562* (2013.01); *H01M 4/133* (2013.01); *H01M 4/134* (2013.01); *H01M 4/366* (2013.01); *H01M 4/661* (2013.01); *H01M 10/0525* (2013.01); *H01M 2004/027* (2013.01); *H01M 2004/028* (2013.01)

(58) Field of Classification Search
CPC ...... H01M 4/133; H01M 4/134; H01M 4/366; H01M 4/405; H01M 10/0562
See application file for complete search history.

(56) References Cited

U.S. PATENT DOCUMENTS

| 6,534,214 B1 | 3/2003 | Nishijima et al. |
| 10,014,559 B2 | 7/2018 | Kodama et al. |

(Continued)

FOREIGN PATENT DOCUMENTS

| CN | 109390622 A | 2/2019 |
| EP | 0 875 951 A1 | 11/1998 |

(Continued)

OTHER PUBLICATIONS

Li et al., U.S. Appl. No. 16/853,881, for All-Solid-State Battery and Method for Producing the Same, filed Apr. 21, 2020.
(Continued)

*Primary Examiner* — Brittany L Raymond
(74) *Attorney, Agent, or Firm* — Dickinson Wright, PLLC

(57) ABSTRACT

Provided is an all-solid-state battery that utilizes a precipitation-dissolution reaction of metallic lithium as a reaction of a negative electrode. The all-solid-state battery has a negative electrode current collector, a Li storage layer containing a fibrous carbon material and a resin, a metal M layer capable of being alloyed with lithium, a solid electrolyte layer, and a positive electrode layer in this order.

5 Claims, 1 Drawing Sheet

(51) Int. Cl.
  *H01M 4/133* (2010.01)
  *H01M 4/134* (2010.01)
  *H01M 4/36* (2006.01)
  *H01M 4/66* (2006.01)
  *H01M 10/0525* (2010.01)

(56) References Cited

U.S. PATENT DOCUMENTS

| | | | |
|---|---|---|---|
| 10,707,523 | B2 | 7/2020 | Harada et al. |
| 11,646,443 | B2 | 5/2023 | Li et al. |
| 2003/0108795 | A1 | 6/2003 | Tamura et al. |
| 2006/0078797 | A1 | 4/2006 | Munshi |
| 2008/0003503 | A1 | 1/2008 | Kawakami et al. |
| 2008/0241684 | A1* | 10/2008 | Muraoka ........... H01M 10/0587 427/58 |
| 2011/0250509 | A1 | 10/2011 | Yamaguchi et al. |
| 2013/0295464 | A1 | 11/2013 | Yanagi et al. |
| 2014/0203787 | A1 | 7/2014 | Yamamoto |
| 2015/0037688 | A1 | 2/2015 | Otsuka et al. |
| 2015/0162643 | A1 | 6/2015 | Tagami et al. |
| 2016/0315353 | A1 | 10/2016 | Matsushita et al. |
| 2017/0155127 | A1 | 6/2017 | Shindo et al. |
| 2017/0207440 | A1* | 7/2017 | Hama ............... H01M 10/4235 |
| 2017/0301957 | A1 | 10/2017 | Park et al. |
| 2018/0226633 | A1 | 8/2018 | Fujiki et al. |
| 2019/0020034 | A1 | 1/2019 | Umetsu et al. |
| 2019/0051925 | A1 | 2/2019 | Li et al. |
| 2019/0051933 | A1 | 2/2019 | Li et al. |
| 2019/0088986 | A1 | 3/2019 | Hu et al. |

FOREIGN PATENT DOCUMENTS

| | | |
|---|---|---|
| JP | H10302794 A | 11/1998 |
| JP | 2010015885 A | 1/2010 |
| JP | 2010044957 A | 2/2010 |
| JP | 4543618 B2 | 9/2010 |
| JP | 2013073846 A | 4/2013 |
| JP | 2013089417 A | 5/2013 |
| JP | 2015028854 A | 2/2015 |
| JP | 2015032355 A | 2/2015 |
| JP | 2016100088 A | 5/2016 |
| JP | 2017103065 A | 6/2017 |
| JP | 2017130283 A | 7/2017 |
| JP | 2017216041 A | 12/2017 |
| JP | 2018129159 A | 8/2018 |
| JP | 2019033053 A | 2/2019 |
| JP | 2019036391 A | 3/2019 |
| WO | 2013/018607 A1 | 2/2013 |
| WO | 2017/126682 A1 | 7/2017 |
| WO | 2017190135 A1 | 11/2017 |

OTHER PUBLICATIONS

Wikipedia "magnesium" (Year: 2023).
Ximeng Li et al., U.S. Appl. No. 16/055,303, filed Aug. 6, 2018 (Related US Application).
Ximeng Li et al., Office Action issued to U.S. Appl. No. 16/055,303 on Nov. 19, 2019.
Ximeng Li et al., Office Action issued to U.S. Appl. No. 16/055,303 on Jul. 27, 2020.
Ximeng Li et al., Office Action issued to U.S. Appl. No. 16/055,303 on Apr. 29, 2021.
Ximeng Li et al., Office Action issued to U.S. Appl. No. 16/055,303 on Jan. 6, 2022.
Ximeng Li et al., Office Action issued to U.S. Appl. No. 16/055,303 on Aug. 3, 2022.
Ximeng Li et al., Notice of Allowance issued to U.S. Appl. No. 16/055,303 on Feb. 21, 2023.
Ximeng Li et al., U.S. Appl. No. 17/016,794, filed Sep. 10, 2020.
Ximeng Li et al., U.S. Appl. No. 17/016,794, Non-Final Office Action dated Sep. 1, 2022.
Ximeng Li et al., U.S. Appl. No. 17/016,794, Final Office Action dated May 2, 2023.
Ximeng Li et al., U.S. Appl. No. 17/016,794, Advisory Action dated Aug. 9, 2023.
Ximeng Li et al., U.S. Appl. No. 17/016,794, Non-Final Office Action dated Oct. 13, 2023.
Ximeng Li et al., U.S. Appl. No. 17/016,794, Notice of Allowance dated Feb. 28, 2024.

* cited by examiner

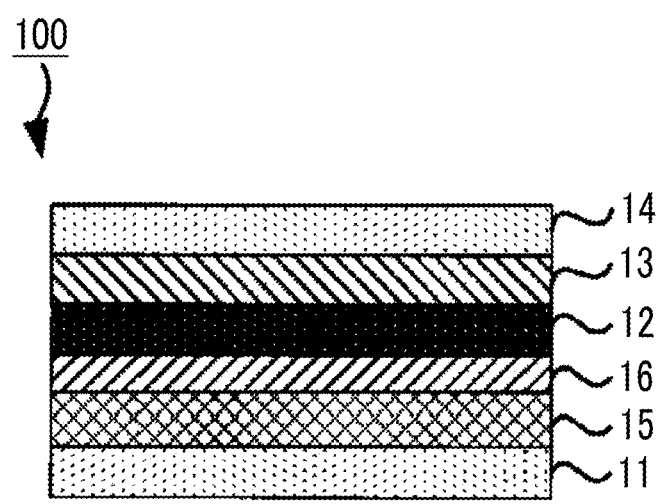

ALL-SOLID-STATE BATTERY

CROSS-REFERENCE TO RELATED APPLICATION

This application is a continuation of U.S. patent application Ser. No. 17/016,794, filed Sep. 10, 2020, which claims priority to Japanese Patent Application No. 2019-173061 filed on Sep. 24, 2019, incorporated herein by reference in its entirety.

BACKGROUND

1. Technical Field

The present disclosure relates to an all-solid-state battery.

2. Description of Related Art

In recent years, information-related devices, communication devices, or the like such as personal computers, video cameras, and mobile phones have become rapidly widespread. As a result, the development of batteries used as power sources of these devices is considered important. Furthermore, in the automobile industry, high-power and high-capacity batteries for electric vehicles or hybrid vehicles are under development.

Among the batteries, a lithium metal secondary battery uses lithium, which has the highest ionization tendency among metals, as a negative electrode. This battery is drawing attention because a large potential difference is created between the negative electrode and a positive electrode, and a high output voltage is obtained from this battery.

In addition, an all-solid-state battery is drawing attention because it uses, as an electrolyte interposed between a positive electrode and a negative electrode, a solid electrolyte instead of an electrolyte solution containing an organic solvent.

In the field of lithium metal secondary batteries, the occurrence of a dendrite-induced short circuit is known. Lithium precipitated on a negative electrode layer during charging grows toward a positive electrode layer, the negative electrode layer and the positive electrode layer thus come into physical contact with each other, and as a result, a short circuit occurs. In order to prevent a short circuit caused by the growth of dendrites, Japanese Unexamined Patent Application Publication No. 2019-033053 (JP 2019-033053 A) discloses a solid-state lithium battery having a Li-precipitated negative electrode. This battery includes a Li storage layer made of a carbon material and a resin between a negative electrode current collector and a solid electrolyte layer.

SUMMARY

Because the solid-state lithium battery described in JP2019-033053A includes a Li storage layer made of a carbon material and a resin between a negative electrode current collector and a solid electrolyte layer, the occurrence of a short circuit is inhibited, and the reversible capacity of the solid-state lithium battery is improved. However, the charge/discharge efficiency of the battery needs to be further improved.

In consideration of the above circumstances, the present disclosure aims to provide an all-solid-state battery having high charge/discharge efficiency.

The present disclosure provides an all-solid-state battery that utilizes a precipitation-dissolution reaction of metallic lithium as a reaction of a negative electrode.

The all-solid-state battery has a negative electrode current collector, a Li storage layer containing a fibrous carbon material and a resin, a metal M layer containing a metal M capable of being alloyed with lithium, a solid electrolyte layer, and a positive electrode layer in this order.

The present disclosure provides an all-solid-state battery that utilizes a precipitation-dissolution reaction of metallic lithium as a reaction of a negative electrode.

The all-solid-state battery has a negative electrode current collector, a Li storage layer containing a fibrous carbon material and a resin, a Li-M alloy layer containing an alloy of lithium and a metal M, a solid electrolyte layer, and a positive electrode layer in this order.

In the present disclosure, the metal M may be metallic magnesium.

In the present disclosure, a thickness of the Li storage layer may be 3 µm or more and 33 µm or less.

In the present disclosure, a thickness of the metal M layer may be 30 nm or more and 5 µm or less.

In the present disclosure, a thickness of the metal M layer may be 100 nm or more and 5 µm or less.

The present disclosure can provide an all-solid-state battery having high charge/discharge efficiency.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic cross-sectional view showing an example of the all-solid-state battery of the present disclosure.

DETAILED DESCRIPTION OF EMBODIMENTS

The present disclosure provides an all-solid-state battery that utilizes a precipitation-dissolution reaction of metallic lithium as a reaction of a negative electrode.

The all-solid-state battery has a negative electrode current collector, a Li storage layer containing a fibrous carbon material and a resin, a metal M layer containing a metal M capable of being alloyed with lithium, a solid electrolyte layer, and a positive electrode layer in this order.

As another embodiment of the present disclosure, there is provided an all-solid-state battery that utilizes a precipitation-dissolution reaction of metallic lithium as a reaction of a negative electrode.

The all-solid-state battery has a negative electrode current collector, a Li storage layer containing a fibrous carbon material and a resin, a Li-M alloy layer containing an alloy of lithium and a metal M, a solid electrolyte layer, and a positive electrode layer in this order.

In the present disclosure, a lithium metal secondary battery means a battery that uses at least either metallic lithium or a lithium alloy as a negative electrode active material and utilizes the precipitation-dissolution reaction of metallic lithium as a reaction of a negative electrode. In addition, in the present disclosure, a negative electrode means an electrode including a negative electrode layer.

In the present disclosure, "state where the all-solid-state battery is fully charged" means a state where a value of State of Charge (SOC) of the all-solid-state battery is 100%. SOC represents the ratio of a charge capacity of a battery to a full charge capacity of the battery. The full charge capacity is SOC 100%. SOC may be estimated, for example, from Open Circuit Voltage (OCV) of the all-solid-state battery.

FIG. 1 is a schematic cross-sectional view showing an example of the all-solid-state battery of the present disclosure.

As shown in FIG. 1, an all-solid-state battery 100 includes a negative electrode current collector 11, a solid electrolyte layer 12, a positive electrode layer 13, and a positive electrode current collector 14 in this order. The battery 100 also includes a Li storage layer 15 and a metal M layer 16 that are layered in this order on the negative electrode current collector 11 between the negative electrode current collector 11 and the solid electrolyte layer 12. The metal M layer 16 includes a metal M capable of being alloyed with Li. In a state where the battery 100 is fully charged after initial charge, the metal M layer 16 may be a Li-M alloy layer containing an alloy of lithium and metal M. A negative electrode layer is not shown in FIG. 1. However, in the present disclosure, there may be a negative electrode layer between the negative electrode current collector 11 and the solid electrolyte layer 12. Furthermore, as long as the negative electrode layer is between the negative electrode current collector 11 and the solid electrolyte layer 12, the negative electrode layer may be present in at least any of the position between the negative electrode current collector 11 and the Li storage layer 15, the position between the Li storage layer 15 and the metal M layer 16, and the position between the metal M layer 16 and the solid electrolyte layer 12. In addition, in a case where the negative electrode layer is made of metallic lithium, the negative electrode layer may be present in the all-solid-state battery 100 in a state where the battery is fully charged or may dissolve and disappear from the all-solid-state battery 100 in a state where the battery has not yet been initially charged or has been fully discharged.

Negative Electrode Current Collector

The material of the negative electrode current collector may be a material that is not alloyed with Li. Examples of the material include SUS, copper, and nickel. The negative electrode current collector can be in the form of, for example, a foil or a plate. The shape of the negative electrode current collector seen in a plan view is not particularly limited. When seen in a plan view, the negative electrode current collector can be in the form of, for example, a circle, an ellipse, a rectangle, or a certain polygon. The thickness of the negative electrode current collector varies with the shape thereof. For example, the thickness is in a range of 1 μm to 50 μm or may be in a range of 5 μm to 20 μm.

Li Storage Layer

The Li storage layer is a layer of a mixture containing a fibrous carbon material and a resin, and is disposed between the negative electrode current collector and the solid electrolyte layer.

Examples of the fibrous carbon material include vapor grown carbon fiber (VGCF), carbon nanotubes, and carbon nanofibers.

Examples of the resin include acrylonitrile butadiene rubber (ABR), butadiene rubber (BR), polyvinylidene fluoride (PVdF), and styrene butadiene rubber (SBR).

The mass ratio between the fibrous carbon material and the resin in the Li storage layer is not particularly limited. Assuming that the total mass of these two materials is 100% by mass, the mass ratio of fibrous carbon material:resin may be 10:90 to 90:10 or 25:75 to 75:25.

The mixture composed of the fibrous carbon material and the resin can be prepared, for example, by methods such as manual mixing using a mortar and pestle, a homogenizer, and mechanical milling. The mechanical milling may be dry mechanical milling or wet mechanical milling.

The mechanical milling is not particularly limited as long as it is a method of mixing the fibrous carbon material with the resin by applying mechanical energy. Examples of the mechanical milling include ball milling, vibration milling, turbomilling, mechanofusion, and disc milling. Among these, ball milling may be adopted, and particularly, planetary ball milling may be adopted.

Examples of liquids used when the mixture is prepared using a homogenizer include aprotic liquids such as a polar aprotic liquid and a nonpolar aprotic liquid.

The thickness of the Li storage layer is not particularly limited, but may be 3 to 33 μm.

Metal M Layer

The metal M layer is a layer that contains a metal M capable of being alloyed with Li and is disposed between the Li storage layer and the solid electrolyte layer. Examples of the metal M capable of alloyed with Li includes at least one kind of metal selected from the group consisting of Mg, Au, Al, and Sn. The metal M may be Mg (metallic magnesium). The metal M layer may contain only one kind of metal M, two or more kinds of metals M, or an alloy of two or more kinds of metals M. As long as the metal M layer contains the metal M as a main component, other metals may be additionally contained in the metal M layer. In the present disclosure, the main component means a component contained in a layer in an amount of 50% by mass or more assuming that the total mass of the layer is 100% by mass.

The thickness of the metal M layer is not particularly limited. However, from the viewpoint of increasing the charge/discharge efficiency and energy density of the all-solid-state battery, the thickness of the metal M layer may be 30 nm to 5 μm, and more preferably 100 nm to 5 μm.

The method for forming the metal M layer is not particularly limited. The metal M layer may be formed by vapor-depositing the metal M on at least one surface of either the solid electrolyte layer or the Li storage layer in a vacuum by using an electron beam vapor deposition apparatus.

Li-M Alloy Layer

After the initial charge of the all-solid-state battery, the metal M and lithium ions react with each other by the initial charge, and in this way, the metal M layer may turn into a Li-M alloy layer containing a Li-M alloy. Furthermore, the Li-M alloy layer may be formed by vapor-depositing a Li-M alloy on at least one surface of either the solid electrolyte layer or the Li storage layer in a vacuum by using an electron beam vapor deposition apparatus.

The proportion of the lithium element in the Li-M alloy may be 30.0 atomic % or higher and 99.8 atomic % or lower in a state where the all-solid-state battery is fully charged. The proportions of elements in the alloy can be calculated by analyzing the alloy by inductively coupled plasma (ICP) analysis or X-ray photoelectron spectroscopy (XPS). The proportions of elements in the alloy are calculated, for example, by a method of taking the Li-M alloy layer out of the fully charged all-solid-state battery, performing ICP analysis on the Li-M alloy layer, and calculating the proportions of elements in the alloy contained in the Li-M alloy layer.

Negative Electrode Layer

In the present disclosure, for example, the negative electrode layer may be disposed between the Li storage layer and the negative electrode current collector when the all-solidstate battery is assembled, or the negative electrode layer is not disposed between the Li storage layer and the negative electrode current collector when the all-solid-state battery is assembled but is formed by the precipitation of metallic lithium as a negative electrode active material by the charging of the assembled all-solid-state battery. In addition, the metallic lithium precipitated between the negative electrode current collector and the solid electrolyte layer after the initial charge is used as a negative electrode active material. Furthermore, the Li-M alloy layer may function as the negative electrode layer.

The negative electrode layer contains a negative electrode active material.

Examples of the negative electrode active material include metallic lithium (Li) and lithium alloys. Examples of the lithium alloys include Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te, and Li—At. As long as the negative electrode layer contains metallic lithium or a lithium alloy as a main component that is a negative electrode active material, the negative electrode layer may additionally contain other conventionally known negative electrode active materials.

The thickness of the negative electrode layer is not particularly limited, but may be 30 nm or more and 5,000 nm or less.

Solid Electrolyte Layer

The solid electrolyte layer contains at least a solid electrolyte.

As the solid electrolyte to be incorporated into the solid electrolyte layer, known solid electrolytes usable in all-solid-state batteries can be appropriately used. Examples of the solid electrolyte include an oxide-based solid electrolyte and a sulfide-based solid electrolyte.

Examples of the sulfide-based solid electrolyte include $Li_2S$—$P_2S_5$, $Li_2S$—$SiS_2$, $LiX$—$Li_2S$—$SiS_2$, $LiX$—$Li_2S$—$P_2S_5$, $LiX$—$Li_2O$—$Li_2S$—$P_2S_5$, $LiX$—$Li_2S$—$P_2O_5$, $LiX$—$Li_3PO_4$—$P_2S_5$ and $Li_3PS_4$. Note that "$Li_2S$—$P_2S_5$" described above means a material formed of a raw material composition containing $Li_2S$ and $P_2S_5$. The same shall be applied to other electrolytes. In addition, "X" in LiX described above represents a halogen element. The raw material composition containing LiX described above may contain one kind of LiX or two or more kinds of LiX. In a case where the composition contains two or more kinds of LiX, the mixing ratio between the two or more kinds of LiX is not particularly limited.

The molar ratio between the elements in the sulfide-based solid electrolyte can be controlled by adjusting the content of the elements in the raw material. The molar ratio between the elements in the sulfide-based solid electrolyte or the composition of the elements can be measured, for example, by ICP emission spectroscopy.

The sulfide-based solid electrolyte may be sulfide glass, crystallized sulfide glass (glass ceramics), or a crystalline material obtained by treating the raw material composition by a solid-phase reaction.

The crystalline state of the sulfide-based solid electrolyte can be checked, for example, by performing X-ray powder diffractometry on the sulfide-based solid electrolyte by using CuKα rays.

The sulfide glass can be obtained by performing an amorphous treatment on the raw material composition (for example, a mixture of $Li_2S$ and $P_2S_5$). Examples of the amorphous treatment include mechanical milling.

The glass ceramics can be obtained, for example, by performing a heat treatment on the sulfide glass.

The heat treatment temperature may be higher than a crystallization temperature (Tc) observed by the thermal analysis and measurement performed on the sulfide glass. Generally, the heat treatment temperature is 195° C. or higher. The upper limit of the heat treatment temperature is not particularly limited.

The crystallization temperature (Tc) of the sulfide glass can be measured by differential thermal analysis (DTA).

The heat treatment time is not particularly limited as long as the desired crystallinity of the glass ceramics is obtained. For example, the heat treatment time is in a range of 1 minute to 24 hours, and particularly in a range of 1 minute to 10 hours.

The heat treatment method is not particularly limited, and examples thereof include a method using a baking furnace.

Examples of the oxide-based solid electrolyte include $Li_{6.25}La_3Zr_2Al_{0.25}O_{12}$, $Li_3PO_4$, and $Li_{3+x}PO_{4-x}N_x$ ($1 \leq x \leq 3$).

From the viewpoint of excellent handleability, the solid electrolyte may be in the form of particles.

The average particle size (D50) of the particles of the solid electrolyte is not particularly limited. However, the lower limit of D50 may be 0.5 µm or more, and the upper limit of D50 may be 2 µm or less.

In the present disclosure, unless otherwise specified, the average particle size of particles is a value of volume-based median diameter (D50) measured by laser diffraction/scattering particle size distribution analysis. In addition, in the present disclosure, the median diameter (D50) is a diameter (volume average diameter) at which the cumulative volume of particles becomes half (50%) of the total volume of all particles in a case where particles are arranged in order from the smallest particles.

One kind of solid electrolyte can be used alone, or two or more kinds of solid electrolytes can be used. In a case where two or more kinds of solid electrolytes are used, the two or more kinds of solid electrolytes may be mixed together, or each of the two or more kinds of solid electrolytes may be formed into two or more layers such that a multilayer structure is established.

The proportion of the solid electrolyte in the solid electrolyte layer is not particularly limited, but is, for example, 50% by mass or higher. The proportion of the solid electrolyte may be in a range of 60% by mass or higher and 100% by mass or lower or in a range of 70% by mass or higher and 100% by mass or lower, or may be 100% by mass.

From the viewpoint of allowing the solid electrolyte layer to express plasticity or the like, a binder can also be incorporated into the solid electrolyte layer. Examples of such a binder include the materials exemplified above as the resin used in the Li storage layer. Here, for example, from the viewpoint of making it possible to form a solid electrolyte layer in which solid electrolytes are prevented from excessively aggregating and uniformly dispersed such that the battery power is easily increased, the amount of the binder to be incorporated into the solid electrolyte can be 5% by mass or less.

The thickness of the solid electrolyte layer is not particularly limited, and is 0.1 µm or more and 1 mm or less in general.

The solid electrolyte layer is formed, for example, by a method of press-molding a powder of a solid electrolyte material containing a solid electrolyte and other optional components. In a case where the powder of the solid electrolyte material is subjected press-molded, generally, a pressure of 1 MPa or higher and 600 MPa or lower is applied.

The pressing method is not particularly limited, and examples thereof include a pressing method that will be exemplified regarding the formation of a positive electrode layer which will be described later.

Positive Electrode Layer

The positive electrode layer contains a positive electrode active material, and may contain a solid electrolyte, a conductive material, a binder, and the like as optional components.

The type of the positive electrode active material is not particularly limited, and any of materials usable as an active material of all-solid-state batteries can be adopted. In a case where the all-solid-state battery is an all-solid-state lithium metal secondary battery, examples of the positive electrode active material include metallic lithium (Li), a lithium alloy, $LiCoO_2$, $LiNi_xCo_{1-x}O_2$ (0<x<1), $LiNi_{1/3}Co_{1/3}Mn_{1/3}O_2$, $LiMnO_2$, Li—Mn spinel substituted with different elements (for example, $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$), lithium titanate (for example, $Li_4Ti_5O_{12}$), lithium metal phosphate (for example, $LiFePO_4$, $LiMnPO_4$, $LiCoPO_4$, and $LiNiPO_4$), lithium compounds such as LiCON, $Li_2SiO_3$, and $Li_4SiO_4$, transition metal oxides (for example, $V_2O_5$ and $MoO_3$), $TiS_2$, Si, $SiO_2$, and lithium-storing intermetallic compounds (for example, $Mg_2Sn$, $Mg_2Ge$, $Mg_2Sb$, and $Cu_3Sb$). Examples of the lithium alloy include the lithium alloys exemplified above as the lithium alloy used as the negative electrode active material.

The form of the positive electrode active material is not particularly limited. The positive electrode active material may be in the form of particles.

A coating layer containing a Li ion-conducting oxide may be formed on the surface of the positive electrode active material, because then the reaction between the positive electrode active material and the solid electrolyte can be inhibited.

Examples of the Li ion-conducting oxide include $LiNbO_3$, $Li_4Ti_5O_{12}$, and $Li_3PO_4$. The thickness of the coating layer is, for example, 0.1 nm or more, and may be 1 nm or more. The thickness of the coating layer is, for example, 100 nm or less, and may be 20 nm or less. The coverage of the coating layer within the surface of the positive electrode active material is, for example, 70% or higher, and may be 90% or higher.

Examples of the solid electrolyte include the solid electrolytes that can be incorporated into the solid electrolyte layer described above.

The content of the solid electrolyte in the positive electrode layer is not particularly limited. Assuming that the total mass of the positive electrode layer is 100% by mass, the content of the solid electrolyte may be, for example, in a range of 1% by mass to 80% by mass.

Known materials can be used as the conductive material, and examples thereof include a carbon material and metal particles. Examples of the carbon material include at least one kind of material selected from the group consisting of carbon black such as acetylene black and furnace black, VGCF, carbon nanotubes, and carbon nanofibers. Among these, from the viewpoint of electron conductivity, one kind of material selected from the group consisting of VGCF, carbon nanotubes, and carbon nanofibers may be used. Examples of the metal particles include particles of Ni, Cu, Fe, and SUS.

The content of the conductive material in the positive electrode layer is not particularly limited.

Examples of the binder include the materials exemplified above as the resin used in the Li storage layer. The content of the binder in the positive electrode layer is not particularly limited.

The thickness of the positive electrode layer is not particularly limited.

The positive electrode layer can be formed by a conventionally known method.

For example, the positive electrode layer is obtained by a method of adding a positive electrode active material and other optional components to a solvent, stirring the mixture to prepare a slurry for a positive electrode layer, coating one surface of a support such as a positive electrode current collector with the slurry for a positive electrode layer, and drying the coated surface.

Examples of the solvent include butyl acetate, butyl butyrate, heptane, and N-methyl-2-pyrrolidone.

The method for coating one surface of the support such as a positive electrode current collector with the slurry for a positive electrode layer is not particularly limited. Examples of the method include a doctor blade method, a metal mask printing method, an electrostatic coating method, a dip coating method, a spray coating method, a roll coating method, a gravure coating method, and a screen printing method.

As the support, the materials having self-supporting properties can be appropriately selected and used without particular limitation. For example, metal foils such as Cu and Al can be used.

The positive electrode layer may also be formed by another method such as a method of press-molding a powder of a positive electrode mixture containing a positive electrode active material and other optional components. In a case where the powder of a positive electrode mixture is press-molded, generally, a pressure of about 1 MPa or higher and 600 MPa or lower is applied.

The pressing method is not particularly limited, and examples thereof include a method of applying pressure by using a flat press, and a roll press.

Positive Electrode Current Collector

The all-solid-state battery generally has a positive electrode current collector that collects current for the positive electrode layer.

As the positive electrode current collector, it is possible to use known metals usable as a current collector of all-solid-state batteries. Examples of such metals include metal materials containing one element or two or more elements selected from the group consisting of Cu, Ni, Al, V, Au, Pt, Mg, Fe, Ti, Co, Cr, Zn, Ge, and In. Examples of the positive electrode current collector include SUS, aluminum, nickel, iron, titanium, and carbon.

The form of the positive electrode current collector is not particularly limited. The positive electrode current collector can be in various forms such as a form of foil and a form of mesh.

The all-solid-state battery optionally includes an outer packaging for housing the positive electrode layer, the negative electrode layer, the solid electrolyte layer, and the like.

The material of the outer packaging is not particularly limited as long as the material is stable against electrolytes. Examples of the material include resins such as polypropylene, polyethylene, and an acrylic resin.

The all-solid-state battery may be a primary battery or a secondary battery. Particularly, the all-solid-state battery may be a secondary battery, because the secondary battery can be repeatedly charged and discharged and is useful, for example, as a vehicle battery. Furthermore, the all-solid-state battery may be an all-solid-state lithium metal secondary battery.

The all-solid-state battery can be in the form of, for example, a coin, a laminate, a cylinder, or a square.

In the method for manufacturing an all-solid-state battery of the present disclosure, for example, first, a powder of a solid electrolyte material is press-molded such that a solid electrolyte layer is formed. Then, on one surface of the solid electrolyte layer, a powder of a positive electrode mixture containing at least one kind of positive electrode active material selected from the group consisting of metallic lithium, a lithium alloy and a lithium compound is press-molded such that a positive electrode layer is obtained. Thereafter, one surface of the negative electrode current collector is coated with a slurry containing a Li storage layer material, and the coated surface is dried such that a Li storage layer is formed. Subsequently, the metal M is vapor-deposited onto one surface of the Li storage layer in a vacuum such that the metal M layer is formed. In this way, a laminate of negative electrode current collector-Li storage layer-metal M layer is obtained. Then, the laminate of negative electrode current collector-Li storage layer-metal M layer is attached to a surface of the solid electrolyte layer that is opposite to the surface on which the positive electrode layer is formed, such that the metal M layer contacts the solid electrolyte layer. A positive electrode current collector may be optionally attached to a surface of the positive electrode layer that is opposite to the solid electrolyte layer, such that the all-solid-state battery of the present disclosure is formed.

In this case, the pressure applied while the powder of a solid electrolyte material and the powder of a positive electrode mixture are being press-molded is about 1 MPa or higher and 600 MPa or lower in general.

The pressing method is not particularly limited, and examples thereof include the pressing method exemplified above regarding the formation of the positive electrode layer.

Example 1

Preparation of Li Storage Layer

VGCF as a fibrous carbon material and PVDF as a resin were weighed such that the mass ratio of VGCF:PVDF became 75:25. These materials were manually mixed together, heptane was then added thereto and mixed together for 3 minutes by using a homogenizer (UH-50, manufactured by SMT Co., Ltd.), thereby obtaining a Li storage layer material as a material of the Li storage layer.

A Cu foil was prepared as a negative electrode current collector, one surface of the Cu foil was coated with the Li storage layer material and dried, thereby forming the Li storage layer on one surface of the Cu foil. The thickness of the Li storage layer was 14 μm.
Preparation of Metal M Layer As the metal M, metal Mg was deposited on one surface of the Li storage layer by using a vacuum vapor deposition device such that a metal Mg layer was formed on one surface of the Li storage layer, thereby obtaining a laminate of negative electrode current collector-Li storage layer-metal Mg layer. The thickness of the metal Mg layer was 100 nm.
Preparation of Positive Electrode Mixture As a positive electrode active material, particles of $LiNi_{1/3}Co_{1/3}Mn_{1/3}O_2$ (manufactured by NICHIA CORPORATION) were used. The surface of the particles of the positive electrode active material had been preliminarily treated with $LiNbO_3$. The positive electrode active material, VGCF (manufactured by SHOWA DENKO K.K.) as a conductive material, and a sulfide-based solid electrolyte ($Li_2S$—$P_2S_5$-based material containing LiBr and LiI) were weighed such that the mass ratio of positive electrode active material:VGCF:sulfide-based solid electrolyte became 85.3:1.3:13.4, and these materials were mixed together, thereby obtaining a positive electrode mixture.
Preparation of all-Solid-State Battery A powder (101.7 mg) of a sulfide-based solid electrolyte ($Li_2S$—$P_2S_5$-based material containing LiBr and LiI) was filled into a ceramic mold (a cylindrical container having a cross-sectional area of 1 $cm^2$ was used) and press-molded under a pressure of 1 ton/$cm^2$, thereby obtaining a solid electrolyte layer.

The aforementioned positive electrode mixture (31.3 mg) was applied to one surface of the solid electrolyte layer and pressed at 6 ton/$cm^2$, thereby forming a positive electrode layer.

The laminate of negative electrode current collector-Li storage layer-metal Mg layer was disposed on a surface of the solid electrolyte layer that was opposite to the positive electrode layer such that the metal Mg layer contacted the solid electrolyte layer, and the laminate was pressed at 1 ton/$cm^2$, thereby obtaining a compressed powder battery.

A positive electrode current collector (aluminum foil) was disposed on and bonded to the positive electrode layer of the compressed powder battery, thereby obtaining an all-solid-state lithium metal secondary battery of Example 1. All the operations using the sulfide-based solid electrolyte were performed in a glovebox with a dry Ar atmosphere.

Example 2

An all-solid-state lithium metal secondary battery was obtained by the same method as that used in Example 1, except that the thickness of the Li storage layer was changed to 33 μm.

Example 3

An all-solid-state lithium metal secondary battery was obtained by the same method as that used in Example 1, except that the thickness of the Li storage layer was changed to 33 μm and the thickness of the metal Mg layer was changed to 30 nm.

Example 4

An all-solid-state lithium metal secondary battery was obtained by the same method as that used in Example 1, except that the thickness of the Li storage layer was changed to 33 μm and the thickness of the metal Mg layer was changed to 5 μm.

Example 5

An all-solid-state lithium metal secondary battery was obtained by the same method as that used in Example 1, except that the thickness of the Li storage layer was changed to 3 μm and the thickness of the metal Mg layer was changed to 30 nm.

Example 6

An all-solid-state lithium metal secondary battery was obtained by the same method as that used in Example 1, except that the thickness of the thickness of the Li storage layer was changed to 3 μm and the thickness of the metal Mg layer was changed to 5 μm.

Comparative Example 1

An all-solid-state lithium metal secondary battery was obtained by the same method as that used in Example 1, except that the Li storage layer and the metal Mg layer were not formed.

Comparative Example 2

An all-solid-state lithium metal secondary battery was obtained by the same method as that used in Example 1, except that the Li storage layer was not formed and the metal Mg layer was not formed on one surface of the Cu foil.

Comparative Example 3

An all-solid-state lithium metal secondary battery was obtained by the same method as that used in Example 1, except that the metal Mg layer was not formed on one surface of the Li storage layer and the thickness of the Li storage layer was changed to 3 μm.

Comparative Example 4

An all-solid-state lithium metal secondary battery was obtained by the same method as that used in Example 1, except that the metal Mg layer was not formed on one surface of the Li storage layer.

Comparative Example 5

An all-solid-state lithium metal secondary battery was obtained by the same method as that used in Example 1, except that the metal Mg layer was not formed on one surface of the Li storage layer and the thickness of the Li storage layer was changed to 33 μm.

Comparative Example 6

An all-solid-state lithium metal secondary battery was obtained by the same method as that used in Example 1, except that the metal Mg layer was not formed on one surface of the Li storage layer, spherical Ketjen black (KB) was used instead of VGCF as a carbon material of the Li storage layer, and the thickness of the Li storage layer was changed to 18 μm.

Comparative Example 7

An all-solid-state lithium metal secondary battery was obtained by the same method as that used in Example 1, except that the metal Mg layer was not formed on one surface of the Li storage layer, spherical Ketjen black was used instead of VGCF as a carbon material of the Li storage layer, and the thickness of the Li storage layer was changed to 25 μm.

Evaluation

Measurement of Charge and Discharge

The all-solid-state lithium metal secondary battery obtained in Example 1 was left in a thermostatic bath at 60° C. for 3 hours and then used for measuring charge and discharge. As measurement conditions, the battery was charged using a constant current (CC) at 60° C. and a current density of 8.7 mA/cm² (rate: 2 C), the charging ended at a point in time when the charge capacity reached 4.35 mAh/cm², and the battery was left to stand for 10 minutes. Thereafter, the battery was discharged using CC at 60° C. and a current density of 0.435 mA/cm² (rate: 0.1 C), and the discharging ended at a point in time when the lower limit voltage reached 3.0 V.

From the discharge capacity and the charge capacity of the all-solid-state lithium metal secondary battery obtained in Example 1, the charge/discharge efficiency was calculated by the following equation.

Charge/discharge efficiency (%)=(discharge capacity/charge capacity)×100

The all-solid-state lithium metal secondary batteries obtained in Examples 2 to 6 and Comparative Examples 1 to 7 were also subjected to the same charge/discharge test as that performed on the all-solid lithium metal secondary battery of Example 1, and the charge-discharge efficiency of each of the batteries was calculated. The results are shown in Table 1.

TABLE 1

|  | Negative electrode current collector | Li storage layer Carbon material | Thickness of Li storage layer (μm) | Type of metal M | Thickness of metal M layer | Charge/discharge efficiency (%) |
|---|---|---|---|---|---|---|
| Comparative Example 1 | Cu | — | — | — | — | 69.4 |
| Comparative Example 2 | Cu | — | — | Mg | 100 nm | 38.0 |
| Comparative Example 3 | Cu | VGCF | 3 | — | — | 88.9 |
| Comparative Example 4 | Cu | VGCF | 14 | — | — | 82.0 |
| Comparative Example 5 | Cu | VGCF | 33 | — | — | 88.7 |
| Example 1 | Cu | VGCF | 14 | Mg | 100 nm | 91.5 |
| Example 2 | Cu | VGCF | 33 | Mg | 100 nm | 96.1 |
| Example 3 | Cu | VGCF | 33 | Mg | 30 nm | 95.7 |
| Example 4 | Cu | VGCF | 33 | Mg | 5 μm | 96.6 |
| Example 5 | Cu | VGCF | 3 | Mg | 30 nm | 95.7 |
| Example 6 | Cu | VGCF | 3 | Mg | 5 μm | 97.0 |

TABLE 1-continued

| | Negative electrode current collector | Li storage layer Carbon material | Thickness of Li storage layer (μm) | Type of metal M | Thickness of metal M layer | Charge/discharge efficiency (%) |
|---|---|---|---|---|---|---|
| Comparative Example 6 | Cu | KB | 18 | — | — | 78.0 |
| Comparative Example 7 | Cu | KB | 25 | — | — | 71.5 |

Evaluation Results

The charge/discharge efficiency is the ratio of the discharge capacity to the charge capacity. In a case where a short circuit occurs or the movement of Li ions is hindered, the charge/discharge efficiency is reduced.

The charge/discharge efficiency of the all-solid-state lithium metal secondary batteries of Examples 1 to 6 that had both the VGCF-containing Li storage layer and metal Mg layer was higher than the charge/discharge efficiency of the all-solid-state lithium metal secondary batteries of Comparative Examples 1 and 2 that did not have the Li storage layer. It is considered that because the batteries of Examples 1 to 6 had the Li storage layer, the occurrence of a short circuit caused by lithium dendrites could be inhibited, and thus the charge/discharge efficiency was increased.

The charge/discharge efficiency of the all-solid-state lithium metal secondary batteries of Examples 1 to 6 was higher than the charge/discharge efficiency of the all-solid-state lithium metal secondary batteries of Comparative Examples 3 and 5 that had the VGCF-containing Li storage layer but did not have the metal Mg layer. This result is assumed to be produced for the following reason. Presumably, in a case where a battery has only the VGCF-containing Li storage layer just as the all-solid-state lithium metal secondary batteries of Comparative Examples 3 to 5, the occurrence of a short circuit could be inhibited, but some metallic lithium trapped in VGCF could not contact the solid electrolyte, which may lead to a state where the metallic lithium cannot dissolve during discharging. On the other hand, in the all-solid-state lithium metal secondary batteries of Examples 1 to 6, due to the presence of the metal Mg layer, lithium ions and Mg react with each other and form an alloy during charging, and a Li—Mg alloy layer can be formed. Due to the Li—Mg alloy layer, Li ions are diffused into the Li—Mg alloy layer when the metallic lithium dissolves (when the all-solid-state batteries are discharged). Presumably, as a result, Li ions may easily move to the positive electrode layer, and the charge/discharge efficiency of the batteries of Examples 1 to 6 could be further improved compared to the charge/discharge efficiency of the all-solid-state battery having only the Li storage layer.

Likewise, the charge/discharge efficiency of the all-solid-state lithium metal secondary batteries of Examples 1 to 6 was higher than the charge/discharge efficiency of the all-solid-state lithium metal secondary batteries of Comparative Examples 6 and 7 having only the Li storage layer containing KB that is spherical carbon. From these results, it is considered that in a case where the all-solid-state battery has both the fibrous carbon-containing Li storage layer and the metal M layer capable of being alloyed with Li, the inhibition of a short circuit and the reversible solubility of metallic lithium could be simultaneously achieved, and consequently, the charge/discharge efficiency could be increased.

As a result of comparing the all-solid-state lithium metal secondary batteries of Examples 2 to 4 that had the Li storage layers of the same length and were different from each other only in terms of the thickness of the metal Mg layer, it has been found that the thicker the metal Mg layer, the higher the charge/discharge efficiency. The same trend was observed as a result the comparing the all-solid-state lithium metal secondary batteries of Examples 5 and 6 that are different from the all-solid-state lithium metal secondary batteries of Examples 2 to 4 in terms of the thickness of the Li storage layer. Therefore, presumably, it is preferable that the metal Mg layer is thick as long as the energy density is not influenced.

Accordingly, it has been proved that an all-solid-state battery having high charge/discharge efficiency can be provided according to the present disclosure.

What is claimed is:

1. A battery that utilizes a precipitation-dissolution reaction of metallic lithium as a reaction of a negative electrode, the battery comprising, in the following order:
   a negative electrode current collector;
   a Li storage layer containing a fibrous carbon material and a resin;
   a negative electrode active material;
   an electrolyte layer; and
   a positive electrode layer, wherein
   the electrolyte layer includes a solid electrolyte layer, and
   the negative electrode active material is a Li-M alloy layer containing an alloy of lithium and a metal M.

2. The battery according to claim 1, wherein the metal M is metallic magnesium.

3. The battery according to claim 1, wherein a thickness of the Li storage layer is 3 μm or more and 33 μm or less.

4. The battery according to claim 1, wherein a proportion of a lithium element in the Li-M alloy is 30.0 atomic % or higher and 99.8 atomic % or lower in a state where the battery is fully charged.

5. The battery according to claim 1, wherein the Li storage layer does not comprise graphite.

* * * * *